(12) United States Patent
Hsu

(10) Patent No.: US 7,255,527 B2
(45) Date of Patent: Aug. 14, 2007

(54) WIND POWER GENERATOR

(76) Inventor: Kao Jung Hsu, NO.95-3, San Jiao Jydu, Neighborhood 5, Dapo Village, Sinwu Township, Taoyuan County 327 (TW)

( * ) Notice: Subject to any disclaimer, the term of this patent is extended or adjusted under 35 U.S.C. 154(b) by 340 days.

(21) Appl. No.: 11/051,212

(22) Filed: Feb. 7, 2005

(65) Prior Publication Data

US 2006/0177311 A1 Aug. 10, 2006

(51) Int. Cl.
*F03D 7/02* (2006.01)

(52) U.S. Cl. .................. 415/4.3; 415/124.2; 415/908; 416/196 A

(58) Field of Classification Search ............ 416/132 B, 416/11, 196 A, 197 A; 415/4.3, 4.5, 122.1, 415/124.1, 124.2, 908, 905; 290/44, 55
See application file for complete search history.

(56) References Cited

U.S. PATENT DOCUMENTS 4,218,175 A * 8/1980 Carpenter ................ 415/219.1
4,278,894 A * 7/1981 Ciman ........................ 290/44
4,288,704 A * 9/1981 Bosard ........................ 290/55
6,132,172 A * 10/2000 Li ................................ 416/11

* cited by examiner

*Primary Examiner*—Edward K. Look
*Assistant Examiner*—Dwayne J White

(57) ABSTRACT

A wind power generator has a base, a wind driving wheel, a transmission unit and a power storage unit. The wind driving wheel has a spindle at a center of the wind driving wheel. The spindle is positioned to the lateral frame. A plurality of connecting frames are extended from a periphery of the spindle. An outer end of each connecting frame is connected to a flow guide plate. A plurality of blades are installed on the flow guide plate. The transmission unit is adjacent to one lateral side of the wind driving wheel. The transmission unit includes a first transmission wheel, a first transmission belt, a first transmission element, a transmission shaft, a second transmission wheel, a second transmission belt, a second transmission element, and a power generator. The power storage unit is connected to the power generator for storing power.

6 Claims, 6 Drawing Sheets

WIND POWER GENERATOR

FIELD OF THE INVENTION

The present invention relates to a wind power generator, and particular to a wind power generator, wherein the device have a larger surface for contacting wind flow, it can be driven effectively and thus the power generation efficiency is better than the prior art. Furthermore, the wind driving wheel is adjacent to a transmission unit so that power transmission distance is short and thus power lose is low.

BACKGROUND OF THE INVENTION

Since the demand of power is dramatically increased with the advance of human life, power generators are important. The conventional thermal power generators and nuclear power generators are not popular due to environment protection problem. Water power generation can not be widely used because it only realizes in some specific places. Thereby wind power generator is an effective way for resolving the problem of deficiency of power.

In the prior art, the wind power generators are formed by three blades which are driven by wind so as to further drive a power generator at the bottom side to generate power. In this prior art structure, since the area of the blades to contact with the wind is smaller and moreover, it is heavy. The power efficiency is low. Further, power transmission distance is long so that the power efficiency is low.

SUMMARY OF THE INVENTION

Accordingly, the primary object of the present invention is to provide a wind power generator, wherein the device have a larger surface for contacting wind flow, it can be driven effectively and thus the power generation efficiency is better than the prior art. Furthermore, the wind driving wheel is adjacent to a transmission unit so that power transmission distance is short and thus power lose is low.

To achieve above object, the present invention provides a wind power generator which has a base, a wind driving wheel, a transmission unit and a power storage unit. The wind driving wheel has a spindle at a center of the wind driving wheel. The spindle is positioned to the lateral frame. A plurality of connecting frames is extended from a periphery of the spindle. An outer end of each connecting frame is connected to a flow guide plate. A plurality of blades are installed on the flow guide plate. The transmission unit is adjacent to one lateral side of the wind driving wheel. The transmission unit includes a first transmission wheel, a first transmission belt, a first transmission element, a transmission shaft, a second transmission wheel, a second transmission belt, a second transmission element, and a power generator. The power storage unit is connected to the power generator for storing power.

The various objects and advantages of the present invention will be more readily understood from the following detailed description when read in conjunction with the appended drawing.

DETAILED DESCRIPTION OF THE INVENTION

Figure 1:
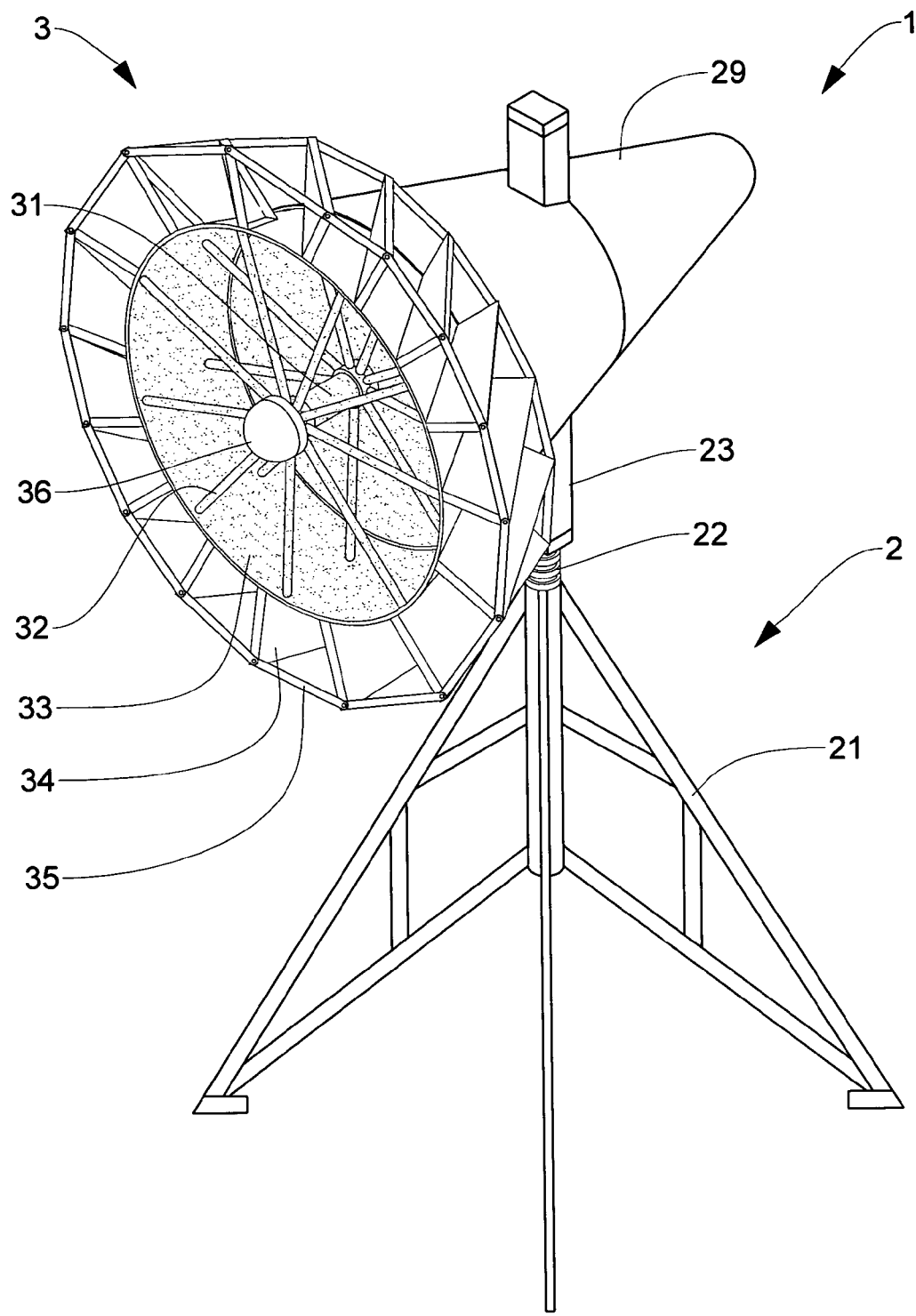
FIG. 1 is a perspective view of the present invention.
Figure 2:
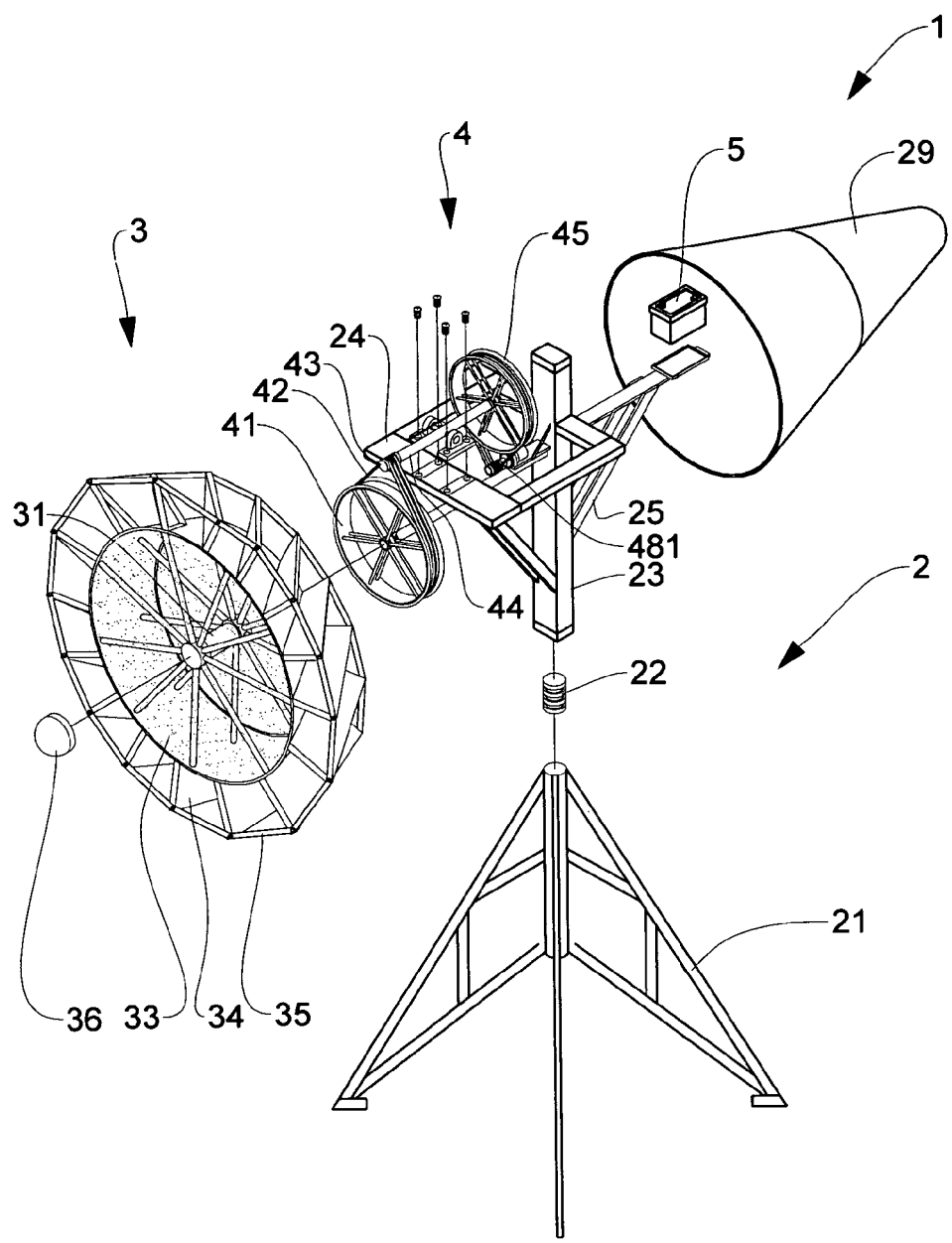
FIG. 2 is a partial exploded perspective view of the present invention.
Figure 3:
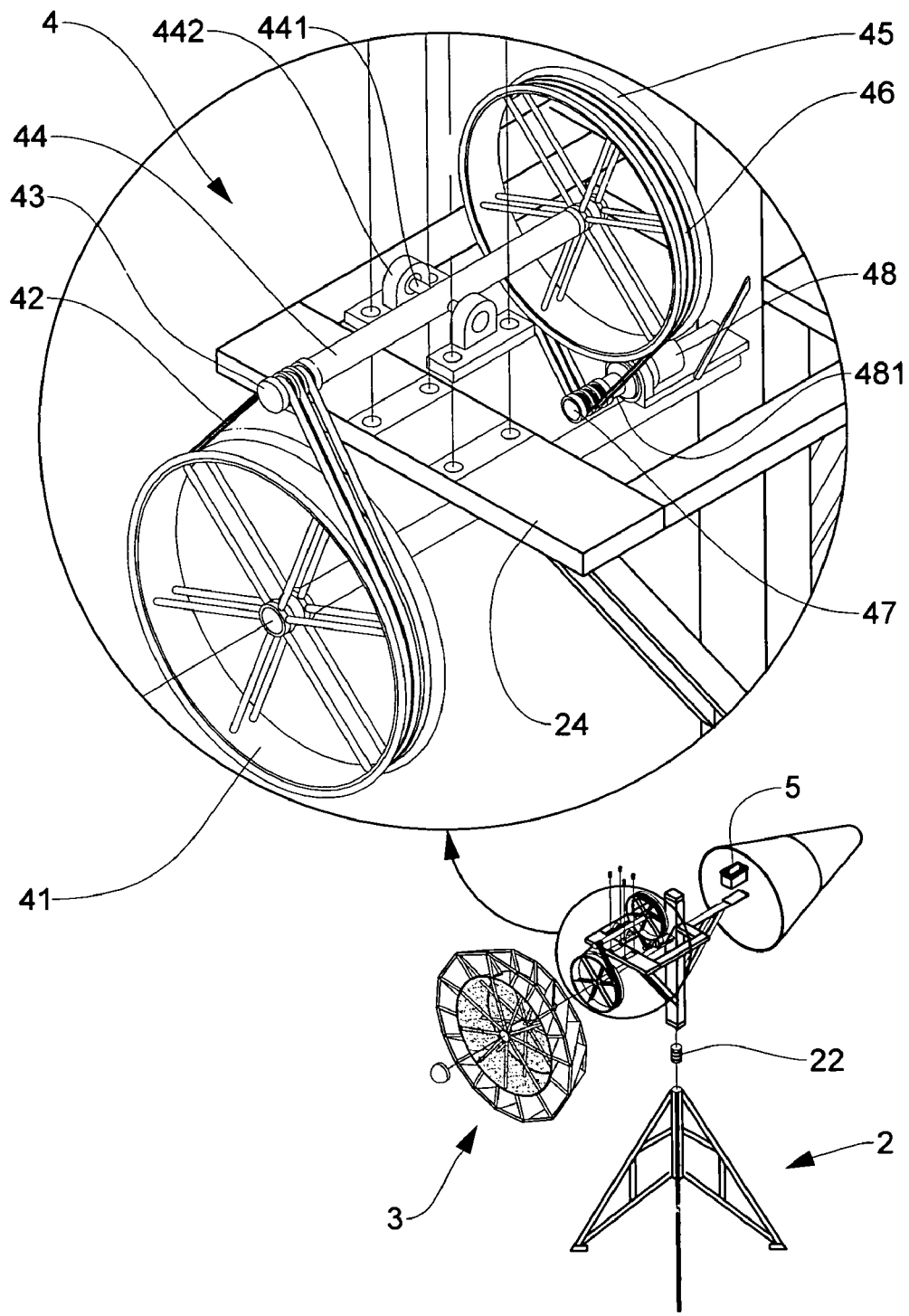
FIG. 3 is a partial enlarged exploded view of the present invention.
Figure 4:
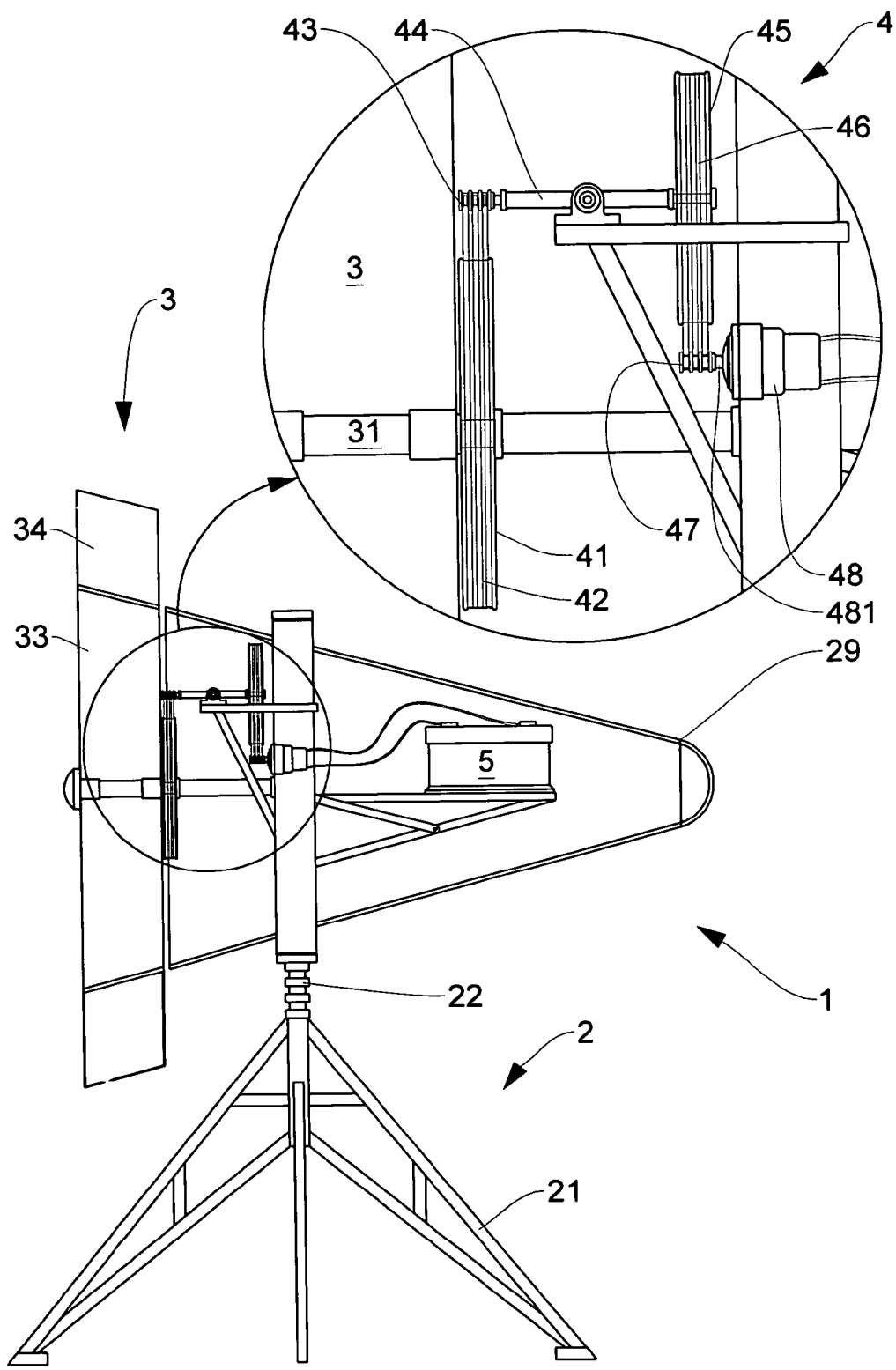
FIG. 4 shows the structure of the present invention.

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Referring to FIGS. 1, 2, 3 and 4 the wind power generator 1 of the present invention is illustrated. The wind power generator 1 has the following elements.

A base 2 has a plurality of legs 21. Tops of the legs 21 are concentrated to a bearing 22. A supporter 23 is installed above the bearing 22. Two lateral sides of the supporter 23 are extended with two lateral frames 24, 25. A flow guide mask 29 is installed above the supporter 23.

A wind driving wheel 3 has a spindle 31 at a center of the wind driving wheel 3. The spindle 31 is positioned to the lateral frame 24. A plurality of connecting frames 32 are extended from a periphery of the spindle 31. An outer end of each connecting frame 32 is connected to a flow guide plate 33. The flow guide plate 33 has a trumpet shape. A plurality of blades 34 are installed on the flow guide plate 33. Each blade 34 is inclined to the spindle 31. Outer ends of each two adjacent blades 34 are connected by a connecting rod 35. One end of the spindle 31 is formed with an end cover 36.

A transmission unit 4 is adjacent to one lateral side of the wind driving wheel 3. The transmission unit 4 includes a first transmission wheel 41, a first transmission belt 42, a first transmission element 43, a transmission shaft 44, a second transmission wheel 45, a second transmission belt 46, a second transmission element 47, and a power generator 48. The first transmission wheel 41 is firmly secured to a connecting frame 32 of the wind driving wheel 3. The first transmission belt 42 winds through the first transmission wheel 41 and the first transmission element 43. The first transmission element 43 is installed to one end of the transmission shaft 44. Another end of the transmission shaft 44 passes through a center of the second transmission wheel 45. The second transmission wheel 45 drives the second transmission element 47 through the second transmission belt 46. The power generator 48 has an end shaft 481 which is connected to the second transmission element 47. An outer sleeve of the transmission shaft 44 is installed with two supporting rods 441. The elevations of the supporting rods 441 are adjustable by the positioning elements 442.

A power storage unit 5 may be installed to a lateral frame 25, for example, within the flow guide mask 29. The power storage unit 5 can also be installed out of the flow guide mask 29 and may be a battery.

Figure 5:
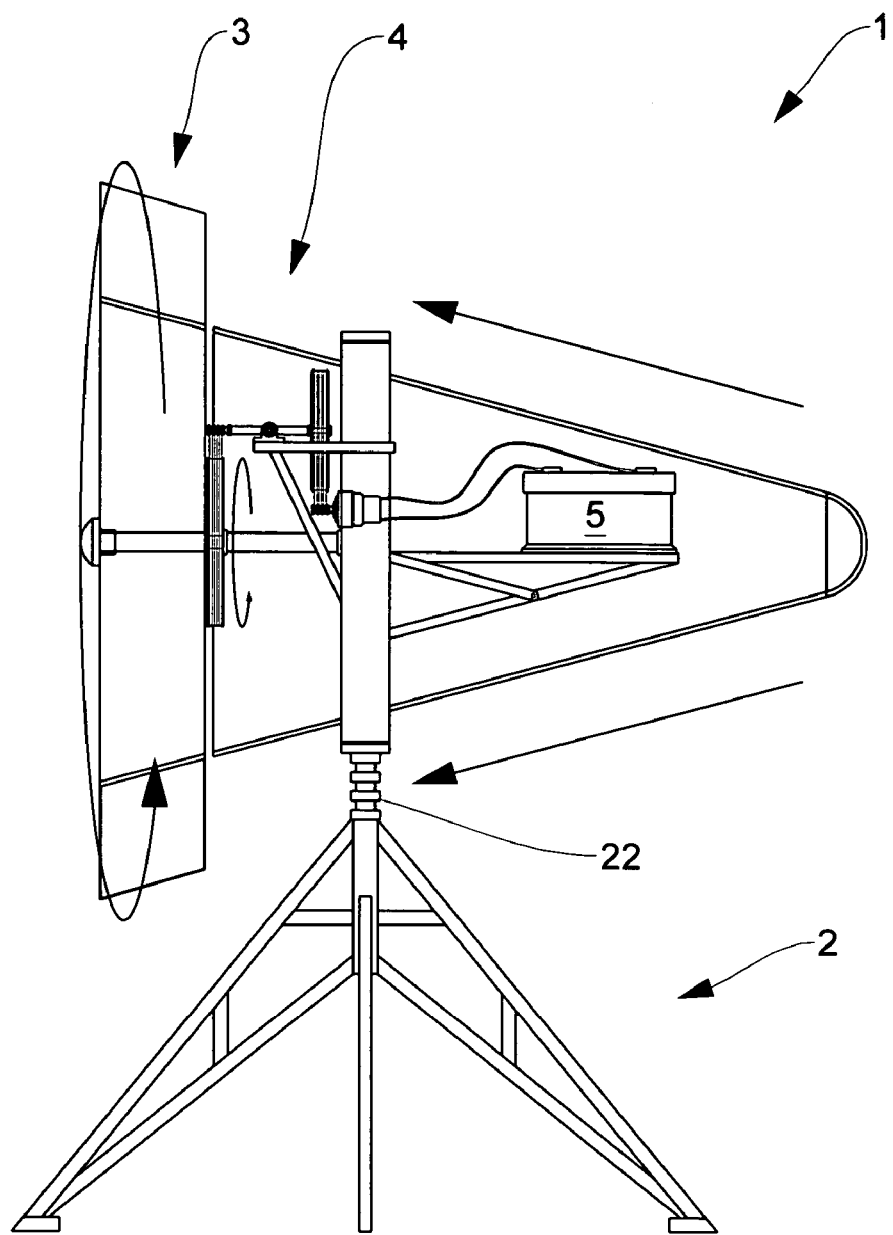
FIG. 5 is a schematic view about the operation of the present invention.

By above structure, when wind blows, as shown in FIG. 5, the flow guide mask 29 will guide wind flow to the blades 34 of the wind driving wheel 3. The inclined blades 34 will drive the wind driving wheel 3 to rotate. Then the first transmission wheel 41 will rotate so as to drive the first transmission belt 42, first transmission element 43, transmission shaft 44, second transmission wheel 45, second transmission belt 46, and the second transmission element 47. Thus, the power generator 48 is driven to generate power and the electric power from the power generator 48 will be stored in the power storage unit 5 for further use.

Figure 6:
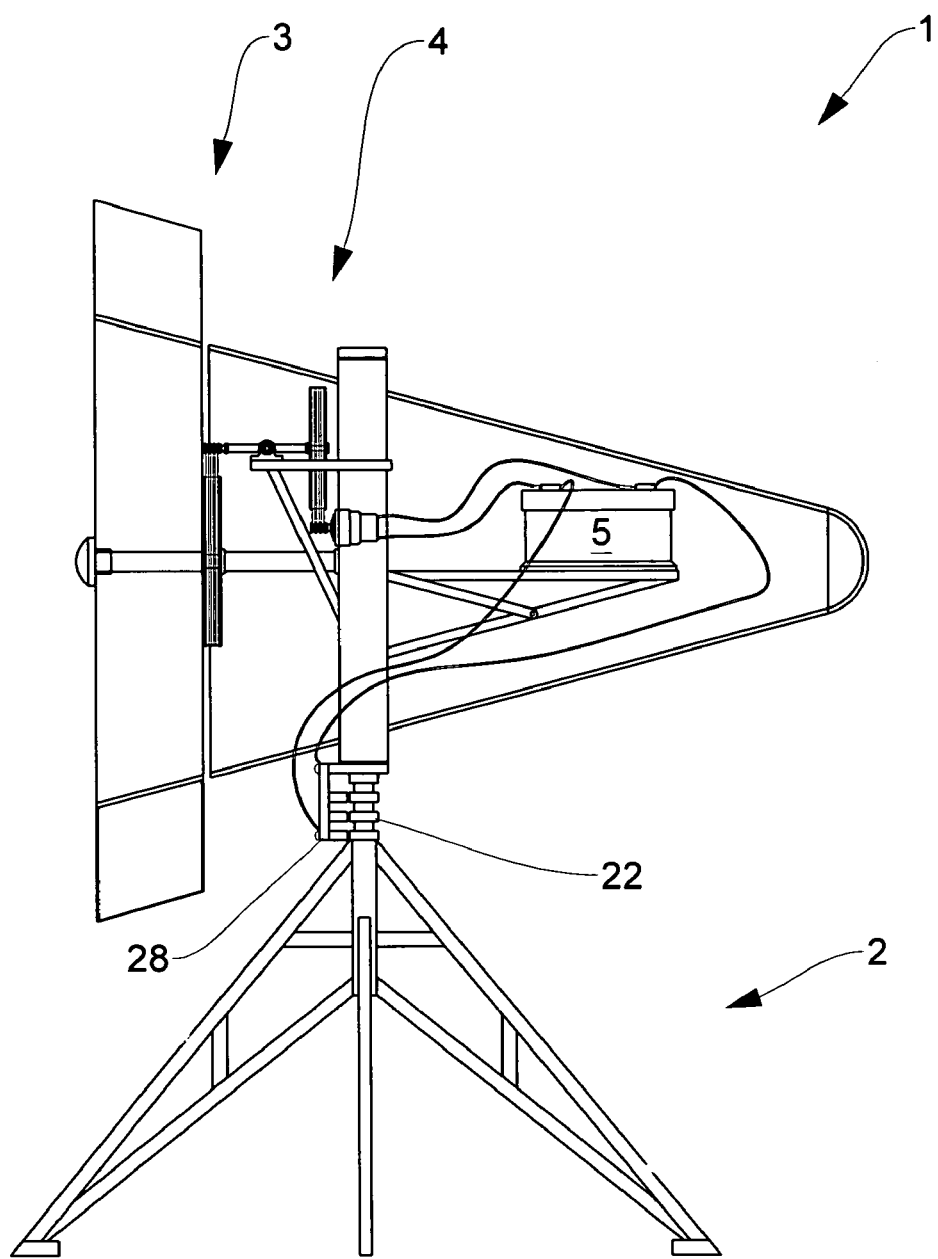
FIG. 6 is a structural view of another embodiment of the present invention.

Referring to FIG. 6, the bearing 22 serves to change the structure thereabove to change direction. Thereby to make the electric wire to be connected with external devices, a rotatable electric joint 28 is installed on the bearing 22.

In realization of the present invention, since the plurality of blades 34 have a larger surface for contacting wind flow, it can be driven effectively and thus the power generation efficiency is better than the prior art. Furthermore, when the greater wind driving wheel 3 rotates through one cycle, it will drive the smaller first transmission belt 42 to rotate through several cycles and the transmission shaft 44 to rotate through several tens cycle. Thus, more power can be generated.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A wind power generator comprising:
   a base having a plurality of legs; tops of the legs being concentrated to a bearing; a supporter being installed above the bearing; lateral sides of the supporter being extended with at least one lateral frame; a flow guide mask being installed above the supporter;
   a wind driving wheel having a spindle at a center of the wind driving wheel; the spindle being positioned to the lateral frame; a plurality of connecting frames being extended from a periphery of the spindle; an outer end of each connecting frame being connected to a flow guide plate; a plurality of blades being installed on the flow guide plate;
   a transmission unit being adjacent to one lateral side of the wind driving wheel; the transmission unit including a first transmission wheel, a first transmission belt, a first transmission element, a transmission shaft, a second transmission wheel, a second transmission belt, a second transmission element, and a power generator; the first transmission wheel being firmly secured to a connecting frame of the wind driving wheel; the first transmission belt winding through the first transmission wheel and the first transmission element; the first transmission element being installed to one end of the transmission shaft; another end of the transmission shaft passing through a center of the second transmission wheel; the second transmission wheel driving the second transmission element through the second transmission belt; the power generator having an end shaft which is connected to the second transmission element; and
   a power storage unit being connected to the power generator for storing power.

2. The wind power generator 1 as claimed in claim 1, wherein the flow guide plate has a trumpet shape.

3. The wind power generator 1 as claimed in claim 1, wherein each blade is inclined to a center axis of the spindle; outer ends of each two adjacent blades being connected by a connecting rod.

4. The wind power generator 1 as claimed in claim 1, wherein one end of the spindle is formed with an end cover.

5. The wind power generator 1 as claimed in claim 1, wherein an outer sleeve of the transmission shaft is installed with two supporting rods; the elevations of the supporting rods are adjustable by the positioning elements.

6. The wind power generator 1 as claimed in claim 1, wherein a rotatable electric joint is installed on the bearing.

* * * * *